J. B. MILES.
ART OF TREATING AIR FOR USE IN METALLURGICAL PROCESSES.
APPLICATION FILED FEB. 12, 1910.
971,297.
Patented Sept. 27, 1910.
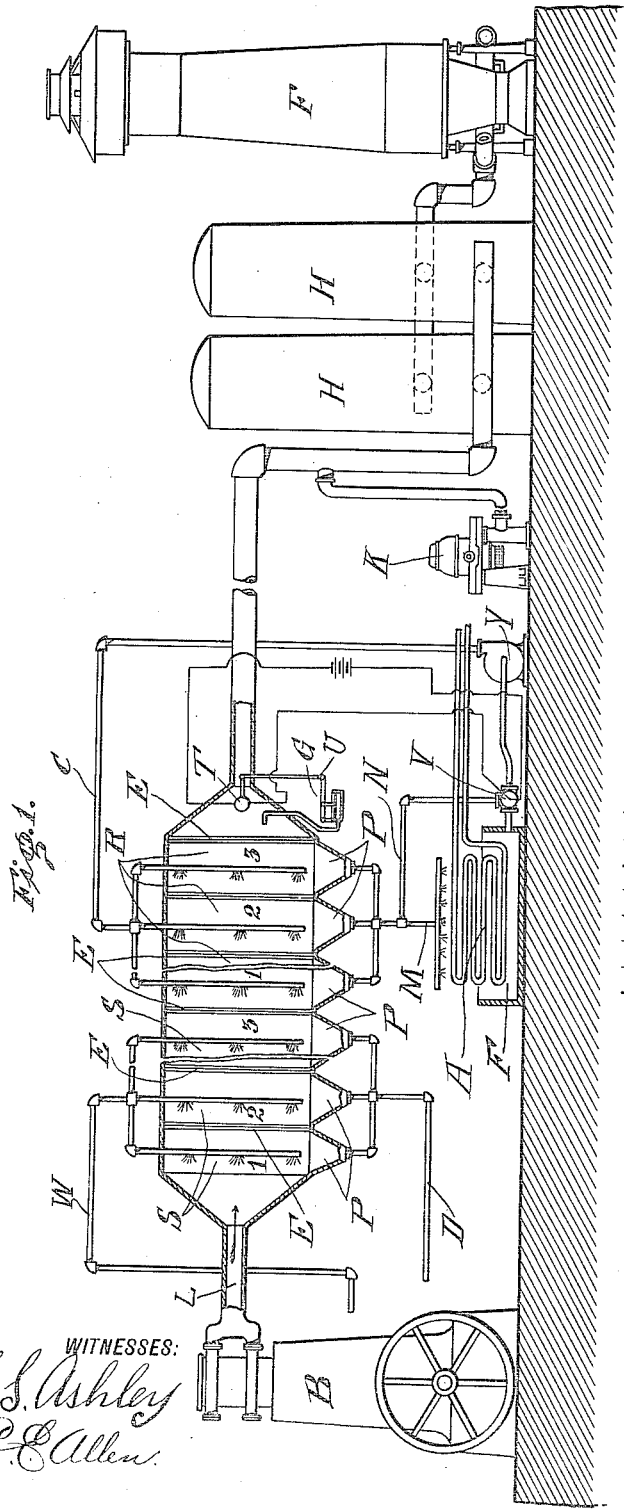
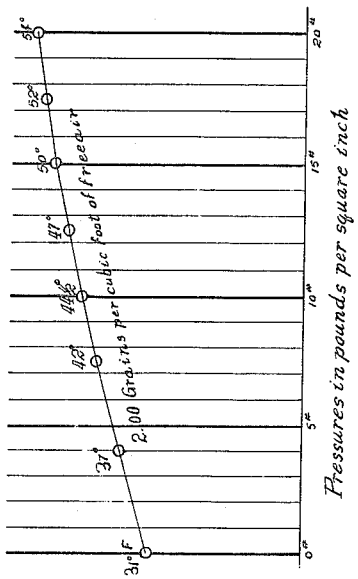
WITNESSES:
C. S. Ashley
R. E. Allen
INVENTOR
John B. Miles
BY Karl Franzig
His ATTORNEY

UNITED STATES PATENT OFFICE.

JOHN B. MILES, OF ST. DAVIDS, PENNSYLVANIA.

ART OF TREATING AIR FOR USE IN METALLURGICAL PROCESSES.

971,297.

Specification of Letters Patent. Patented Sept. 27, 1910.

Application filed February 12, 1910. Serial No. 543,457.

*To all whom it may concern:*

Be it known that I, JOHN B. MILES, a citizen of the United States, residing at St. Davids, county of Delaware, State of Pennsylvania, have invented certain new and useful Improvements in the Art of Treating Air for Use in Metallurgical Processes, of which the following is a specification.

The object of my invention is to eliminate irregularities in metallurgical processes due to the varying amount of moisture in the air usually employed in such processes; also during the greater part of the year to reduce the quantity of moisture contained in the air.

Another process is in use for the reduction of moisture the apparatus used in which is expensive to build on account of the size of the refrigerating plant and the buildings, and on account of the great length of pipe required in the cooling chambers. This process cools the air before it enters the blowing engine. It cannot economically make use of the cooling effect to be derived from water taken from a natural source such as a river, lake or well, and it lacks the regulation of moisture content other than its partial elimination at times.

In my process, I may cool the air after compression in a blowing engine, with water taken from a natural source, in a preliminary stage and complete the cooling in a final stage with water artificially cooled, saturating or nearly saturating the air with moisture, and changing the temperature to which the air is reduced, as the pressure varies, in order that the moisture content as per cubic foot of free or uncompressed air shall remain constant. By treating the air after compression instead of before compression, it is not necessary to cool it to such a low temperature as in the latter case, in order to reduce the moisture to the same content. Inasmuch as natural water may be used in removing the heat of compression, the necessary capacity of the refrigerating apparatus is much less than when cooling before compression is employed. That cooling to a higher temperature is possible for the same result is due to the fact that a cubic foot of space can contain the same maximum of moisture at a certain temperature no matter what the pressure may be. At $44\frac{1}{2}$ degrees Fahr. saturated air contains 3.36 grains of moisture per cubic foot irrespective of the pressure. If a cubic foot of air at 90 degs. containing $8\frac{1}{2}$ grains of moisture is cooled to $44\frac{1}{2}$ degs., 4.14 grains are condensed, leaving 3.36 grains in the air. If on the other hand, a cubic foot of 90 degs. air with $8\frac{1}{2}$ grains is compressed to 10 pounds pressure per square inch and then cooled to $44\frac{1}{2}$ degs. as it can still only contain 3.36 grains of moisture per cubic foot of the compressed air and the cubic foot of free air is reduced by the compression to .595 of a cubic foot, the moisture in it will be .595 of 3.36 grains or 2.00 grains. If the air were expanded to atmospheric pressure, it would contain 2 grains per cubic foot, *i. e.* its moisture content would be 2 grains per cubic foot of free air. If the same air is compressed to $12\frac{1}{2}$ pounds per square inch and cooled to $47°$, it will contain 3.7 grains per cubic foot of compressed air which is equivalent to 2 grains per cubic foot of free air. In each case the air contains approximately $25\frac{1}{2}$ grains of moisture per pound of air.

In my process, by bringing the air in contact with water, I add moisture, if the free air should contain less than the predetermined quantity.

In the accompanying drawings, I have shown one form of apparatus in which to carry on my improved process in connection with a blast furnace or a Bessemer converter. Other forms of apparatus may be used in which the same principles are employed without departing from my invention.

Figure 1 is a side elevation, portions being broken away to show the interior construction. Fig. 2 is a curve showing the various temperatures to which it is necessary to cool the air in order that when saturated with moisture and at the pressures on the base line the compressed air will contain the equivalent of two grains of moisture per cubic foot of free or uncompressed air. A similar curve can be constructed for any desired moisture content.

I have shown the usual blast furnace F with stoves H and blowing engine B with pipe L leading to the cooling apparatus between the blowing engine and the furnace. K is a Bessemer converter also connected with the cooling apparatus.

Into the cooling chambers marked $S^1$, $S^2$ and $S^3$, forming the first stage, may be sprayed water from some natural source such as a river, lake or Artesian well. Into refrigerating chambers R¹, R², and R³, forming the second stage, may be sprayed water which has been artificially cooled. The water drops into the pans P entrained moisture being intercepted by the eliminators E.

W is a pipe for conveying water to the chambers S¹, S² and S³, and D is a pipe carrying water away from the pans P of these chambers.

Y is a pump supplying refrigerated water through pipe C to the chambers R¹, R² and R³.

M is a pipe conveying water from the pans P of these chambers which is cooled by falling over the cooling coils A through which passes ammonia or some other refrigerant. Part of the water from the second stage may be passed around A through pipe N and mixing valve V to the pump Y.

G is a regulating device containing a diaphragm on one side of which the pressure in the refrigerating chamber acts, the other side of the diaphragm being open to the air. The movement of the diaphragm is communicated through a system of levers U, to the regulating apparatus of a thermostat T in the outlet end of the cooling apparatus which controls a mixing valve V and thereby the temperature of the water admitted to the chambers R¹, R², and R³.

The operation of the apparatus described is as follows:—if, for illustration, air at 90 degs. Fahr. and containing 8½ grains of moisture per cubic foot is compressed to 10 pounds per sq. in., and the water for the first stage is at 80 degs., the air can be cooled in the first stage from 175 degs. to 85 degs. In the second stage, the air enters at 85 and leaves at 44½ degs., the water entering the second stage at 42 degs. and leaving R¹, at 60°, R² at 49½°, and R³ at 44½°, the average being 51½°. The compressed air leaving the second stage at 44½ degs. saturated, contains 3.36 grains of moisture per cubic foot which is the equivalent of 2 grains per cubic foot of free or uncompressed air.

It is well known that the pressure required to force air through a blast furnace varies from time to time as the condition of the charge in the furnace changes. If the pressure should rise to 12½ pounds per sq. in. and to 190 degs. at the blowing engine, the air would still be reduced to practically 85 degs. in the first stage. In order to maintain a moisture content equivalent to 2 grains per cubic foot of free or uncompressed air, the air leaving R³ should contain 3.70 grains per cubic foot at 12½ pounds per square inch, and if saturated, must be cooled to 47 degs. The rise in pressure will move the diaphragm in G which will set thermostat T to 47 degs. The valve V actuated by the thermostat T will so control the mixture of warm water from M and cold water from F that the temperature of air leaving R³ is maintained at 47 degs. so long as the pressure remains at 12½ pounds per sq. in. Any change in pressure will automatically change the temperature of the outgoing air so that the moisture content per cubic foot of free air is maintained constant. Hand control of valve V may be substituted for the automatic means described or the regulating device G may be omitted and the thermostat be set by hand.

By manipulation of the ammonia in A the temperature of the water in F will be maintained such that it can reduce the air to the lowest temperature to which it may be found advisable to work the apparatus.

By adjustments of counter-weights or springs, not shown in connection with G the apparatus will automatically so control the temperature of the outgoing air that other moisture contents per cubic foot of free air than the 2 grains named above may be secured.

I do not claim the apparatus specifically in this application.

I claim as my invention:

1. In the art of treating air, compressing the air, and cooling the air to a temperature varying as the pressure of the compressed air varies so that the amount of moisture in a pound of air remains constant.

2. In the art of treating air for use in apparatus requiring air at varying pressures, compressing the air to a pressure varying with the requirements of the apparatus, varying the temperature of the air in such relation to the pressure that the amount of moisture in a pound of air remains constant, and feeding the air to the apparatus in which it is to be used.

3. In the art of treating air for use in metallurgical apparatus, compressing the air to a pressure varying with the pressure necessary to force it through the furnace charge, varying the temperature of the air in such relation to the pressure that the amount of moisture in a pound of air remains constant, and feeding the air to metallurgical apparatus.

4. In the art of treating air, compressing the air, reducing its temperature by a natural cooling medium, bringing it into intimate free contact with water whereby it is saturated and brought to approximately the temperature of the water, varying the water temperature as the pressure of the compressed air varies so that the treated air will contain always the same amount of moisture per pound irrespective of its pressure, and removing water held in suspension.

5. In the art of treating air, compressing the air, passing the air through water, and maintaining the air at a temperature varying as the pressure of the compressed air varies so that the amount of moisture in a pound of air remains constant.

6. In the art of treating air for use in apparatus requiring air at varying pressures, compressing the air to a pressure varying with the requirements of the apparatus, varying the temperature of the air in the presence of water in such relation to the pressure that the amount of moisture in a pound of air remains constant, and feeding the air to the apparatus in which it is to be used.

Signed at Philadelphia, this ninth day of February, 1910.

JOHN B. MILES.

Witnesses:
FREDERICK H. JORAT,
L. M. HUDNUT.